INVENTOR.
Elbert M. Sawyer
BY C. R. Meland
HIS ATTORNEY

United States Patent Office 3,378,755
Patented Apr. 16, 1968

3,378,755
ALTERNATOR POWER SUPPLY SYSTEM
Elbert M. Sawyer, Anderson, Ind., assignor to General Motors Corporation, Detroit, Mich., a corporation of Delaware
Filed Apr. 10, 1964, Ser. No. 358,909
5 Claims. (Cl. 322—29)

ABSTRACT OF THE DISCLOSURE

An alternating current generator is provided for feeding an electrical load. The generator has a polyphase winding which can be switched into a Y or a delta connection. The switching of the polyphase winding is controlled by various control arrangements. In one arrangement the winding is switched from Y to delta when the speed of the generator exceeds a predetermined value. The switching from Y to delta can also be accomplished in response to load current and in response to the output frequency of the voltage developed by the generator.

---

This invention relates to an alternator power supply system and more particularly to a system which is capable of connecting the output winding of an alternating current generator in delta or in Y to provide optimum performance at varying engine speeds of the prime mover that drives the alternator.

A synchronous generator, which is operated over a variable speed range, exhibits an inherent current-limiting characteristic. As the speed of the generator is increased, the output current approaches a limit asymptotically.

In many applications such as on a motor vehicle electrical system, it is desirable to be able to take more power out of the generator than that for which it was originally designed. This is caused by increased loads which from time to time are added to the system. It is possible to change the stator winding of such a machine to obtain more output current at low speed but this sacrifices high speed performance.

In order to obtain optimum performance from the generator, it is proposed by this invention to provide an electrical system where the output winding of the generator can be switched from Y to delta and vice-versa. In carrying this object forward, the alternator output winding is connected in a Y connection for low speed operation and then is switched to a delta connection for higher speed operation. This provides a system which will insure optimum output from the generator over the widely varying speed range of the engine.

Another object of this invention is to provide an electrical system including an alternating current generator and to provide a means for switching the output winding of the generator from Y to delta in response to the attainment of a predetermined output current from the generator.

Another object of this invention is to provide an electrical system that is fed by an alternator and to provide means for switching the output winding of the alternator from Y to delta in accordance with speed of the prime mover which drives the alternator.

Still another object of this invention is to provide an electrical system wherein the switching from Y to delta is controlled by a high pass filter connected with one of the windings of the alternator.

Further objects and advantages of the present invention will be apparent from the following description, reference being had to the accompanying drawings wherein preferred embodiments of the present invention are clearly shown.

Figure 1:
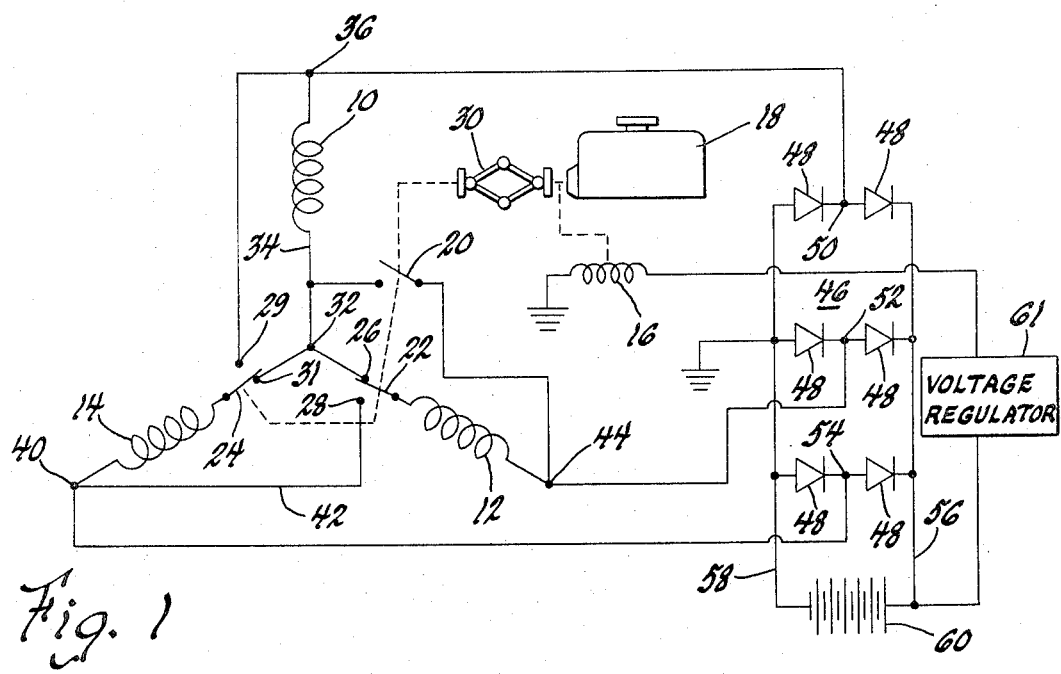
FIGURE 1 is a schematic circuit diagram of a switching arrangement for switching the output winding of an alternator from Y to delta in response to prime mover speed.

Referring now to the drawings and more particularly to FIGURE 1, the reference numerals 10, 12 and 14 designate the phase windings of a three phase output winding of an alternating current generator. The windings 10, 12 and 14 can be stationary windings and the alternating current generator can have a rotor 16 which is driven by an engine 18. In some cases, the rotor 16 can carry the field winding of the generator as is illustrated in FIGURE 1. The alternating current generator can be of any other type, however, and could be of a type which has a fixed field winding which is normally referred to as a brushless type.

The electrical system of FIGURE 1 includes a plurality of contacts 20, 22, 24, 26 and 28, 29 and 31. The contacts 20, 22 and 24 are all controlled by a centrifugal mechanism 30 that is driven by the engine 18. The contacts 22 and 24 form part of a single pole double throw arrangement and cooperate respectively with fixed contacts 26 and 28 and 29 and 31. The contact 20 is part of a single pole single throw switch. These contacts are arranged such that below a predetermined speed of the engine 18, the contacts 22 and 26 and 24 and 31 are closed or engaged. As the engine speed goes above this predetermined value, the contact 24 will engage 29, contact 22 will engage 28 and contact 20 will close. The centrifugal switch can be arranged so that contacts 20, 22 and 28 and 24 and 31 close at slightly above the predetermined speed and can be arranged such that contacts 22 and 26 and 24 and 31 close and contact 20 opens, at a speed which is slightly below the predetermined speed.

It is seen that contacts 26 and 31 are connected together at junction 32. The junction 32 is connected with conductor 34 which in turn is connected to one side of the phase winding 10. The opposite side of the phase winding 10 is connected with junction 36. The contact 29 is connected with junction 36. The phase winding 14 is connected between contact 24 and junction 40. The junction 40 is connected with contact 28 through conductor 42. The phase winding 12 is connected between contact 22 and the junction 44.

The electrical system of FIGURE 1 includes a three phase full wave bridge rectifier generally designated by reference numeral 46. This bridge rectifier is made up of six diodes 48 which preferably are of the PN junction semiconductor type and preferably are silicon diodes. It is seen that the AC input terminals 50, 52 and 54 of the bridge rectifier are connected respectively with junctions 36, 44 and 40. Direct current is taken from the bridge rectifier across conductors 56 and 58 and these conductors are used to supply the direct current loads on the motor vehicle such as the storage battery 60. A voltage regulator 61 is used to regulate field current in a conventional manner.

When the engine 18 is driving the rotatable field winding 16 and when this field winding is energized between conductor 56 and ground and through the voltage regulator 61, the generator phase windings will have a voltage induced therein. When the engine is operating below a predetermined speed, the phase windings 10, 12 and 14 are connected in a Y connection with the bridge rectifier 46 since the contacts 22 and 26 and 24 and 31 are closed and the contact 20 is open.

When the speed of the engine 18 rises above a predetermined value, the contacts 24 and 29 and 22 and 28 will close as will contact 20. It can be seen that this will connect the phase windings 10, 12 and 14 in a delta connection from the previous Y connection.

Figure 2:
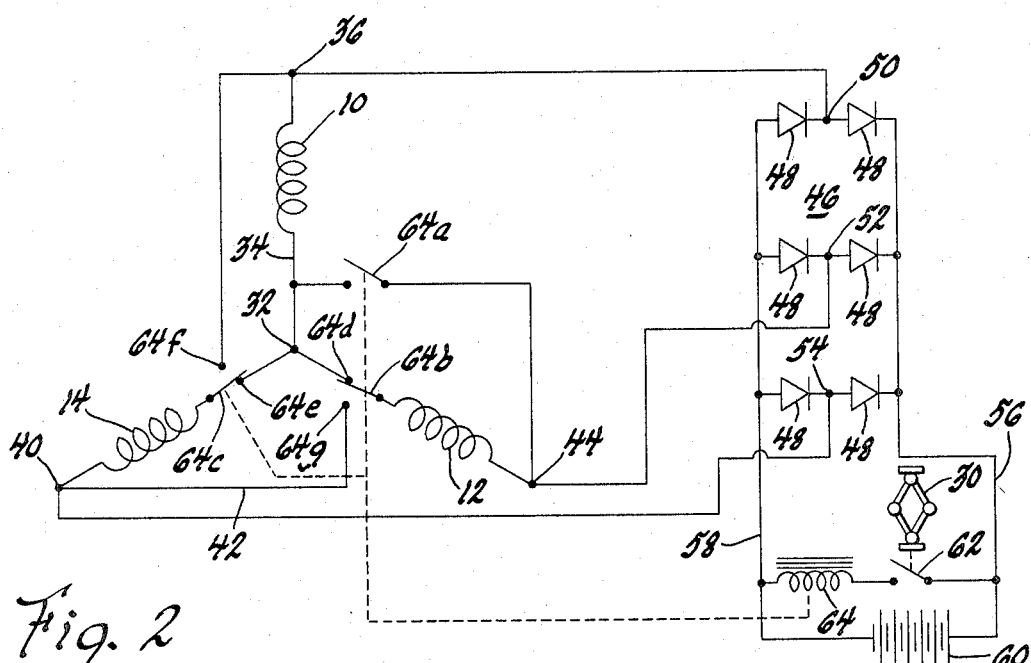
FIGURE 2 is a system similar to FIGURE 1 but where the switching is controlled by a relay and a centrifugal switch.

Referring now to FIGURE 2, a modified system is illustrated for switching the phase windings of the generator from Y to delta when the speed of the engine goes above a predetermined value. In FIGURE 2, the same reference numerals are used as were used in FIGURE 1 to identify the same parts in each figure.

In the FIGURE 2 arrangement, a centrifugal switch 62 driven by the engine 18 controls the energization of a relay coil 64 connected across the power output conductors 56 and 58 of the bridge rectifier 46. The relay 64 controls the movement of contacts 64a, 64b and 64c. When the relay coil 64 is deenergized, contact 64a is open, contact 64b engages 64d and contact 64c engages 64e. When relay coil 64 is energized, the contact 64a closes, contact 64c engages 64f and contact 64b engages 64g.

It will be appreciated from the foregoing that when the speed of the engine 18 exceeds a predetermined value, the centrifugal switch 62 will close which causes the relay coil 64 to be energized and therefore causes the phase windings to be connected from a Y arrangement to a delta arrangement. When the speed of the engine 18 drops below the predetermined value, the phase windings are connected from a delta connection to a Y connection.

Figure 3:
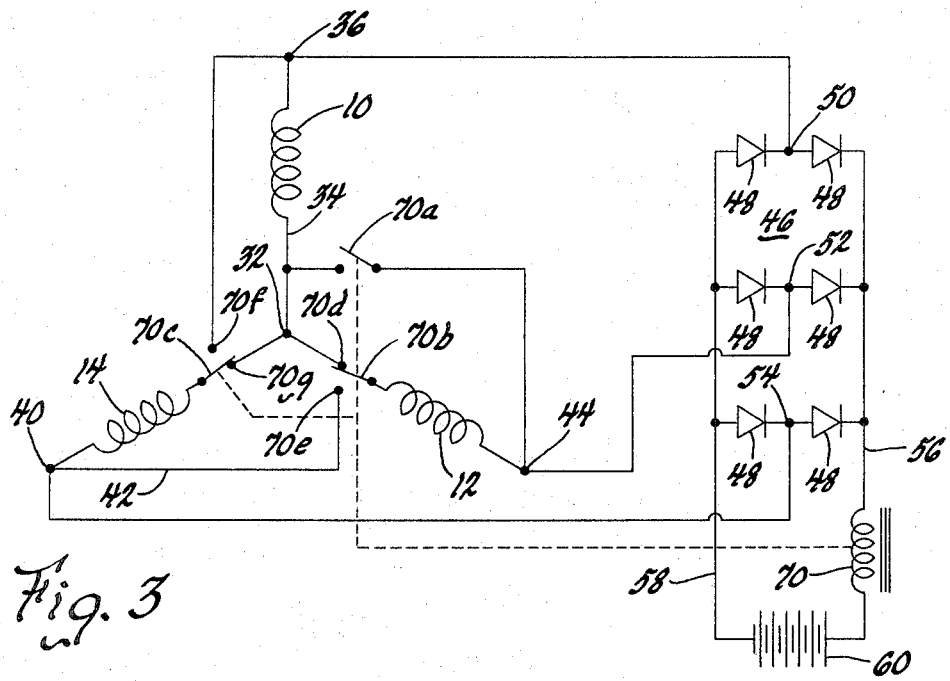
FIGURE 3 illustrates a switching system which is controlled by the current output of the generator.

Referring now to FIGURE 3, another arrangement is illustrated for controlling the connection of the phase windings of the alternator. In FIGURE 3, the engine and the field winding for the generator have not been illustrated but they are the same as that shown in FIGURE 1. The same reference numerals have been used in FIGURE 3 to identify the same parts as were used in FIGURE 1.

In FIGURE 3, the connection of the phase windings is controlled by a current relay which includes an actuating coil 70 and contacts 70a, 70b, 70c, 70d and 70e, 70f and 70g. When the actuating coil 70 is not energized sufficiently, the contact 70a is open, 70b engages 70d and 70c engages 70g. When the relay coil 70 is energized sufficiently, the contact 70a is closed, 70b engages 70e and 70c engages 70f.

It is seen that the relay coil 70 is connected in series with the power output conductor 56 and therefore will respond to the magnitude of current being supplied to the direct current load 60 on the motor vehicle.

Figure 4:
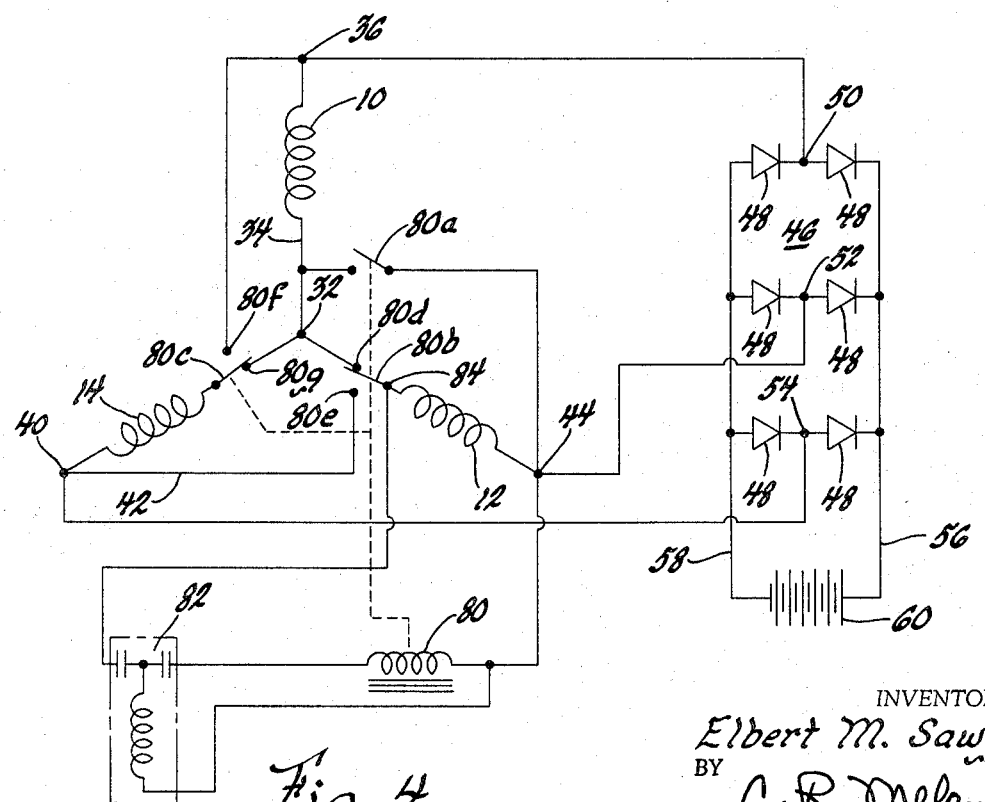
FIGURE 4 illustrates a switching system where the switching is controlled by a high pass filter and a relay.

In the system of FIGURE 4, the Y-connection of the phase windings is maintained until there is a heavy current demand whereupon the phase windings are connected in delta.

Referring now to FIGURE 4, another system is illustrated for connecting the phase windings either in a Y connection or in a delta connection depending upon the speed of the prime mover that drives the alternator. In FIGURE 4, the prime mover and the field for the generator again have not been shown but they are the same as that shown in FIGURE 1. The same reference numerals have been used in FIGURE 4 to identify parts that are the same as those shown in FIGURE 1.

In the FIGURE 4 arrangement, a relay is provided which has an actuating coil 80 and contacts 80a, 80b, 80c, 80d and 80e, 80f and 80g. When the relay coil 80 is not energized sufficiently, the contact 80a is open, 80b engages 80d and 80c engages 80g. When the relay coil 80 is energized sufficiently, the contact 80a is closed, 80b engages 80e and 80c engages 80f.

The relay coil 80 is connected in series with a high pass filter 82. One side of the high pass filter is connected with junction 84 and is therefore connected to one side of the phase winding 12. One side of the relay coil 80 is connected with junction 44 and therefore is connected to an opposite side of the phase winding 12. It is seen therefore that the relay actuating coil 80 and the high pass filter 82 are connected in series and across the phase winding 12.

Since the frequency of the voltage developed in phase winding 12 will increase with increasing prime mover speed, the relay coil 80 will be energized through the high pass filter 82 whenever the frequency is above a predetermined value. Thus the high pass filter will only pass frequencies above a predetermined value and when this value is reached, the relay coil 80 is energized sufficiently to cause the phase windings to be connected in delta from their previous Y connection. When the frequency of the alternator drops below a predetermined value, the high pass filter will block this frequency and the relay coil 80 is not energized sufficiently to maintain the delta connection. As a result, the phase windings will be connected back to a Y connection from the delta connection. The high pass filter 82 is conventional and can include two capacitors and an inductance as shown.

While the embodiments of the present invetnion as herein disclosed constitute a preferred form, it is to be understood that other forms might be adopted.

What is claimed is as follows:

1. An electrical system comprising, an alternating current generator having a polyphase output winding, a variable speed prime mover driving a rotatable element of said generator, an electrical load connected to said polyphase output winding, switching means connecting said polyphase output winding in a Y-connection or in a delta connection, and control means responsive to a condition which is indicative of the speed of said rotatable element of said generator coupled to said switching means, said control means operating said switching means to connect said polyphase winding in a Y-connection when said speed of said rotatable element of said generator is below a predetermined speed, said control means operating said switching means to connect said polyphase winding in a delta connection when the speed of said rotatable element of said generator exceeds said predetermined value.

2. An electrical system comprising, an alternating current generator having a polyphase output winding, an electrical load, a plurality of conductors connecting said electrical load and said polyphase winding, a variable speed prime mover coupled to said generator for driving the rotatable element of said generator, switching means operable to connect said polyphase winding in a Y or a delta connection, and control means responsive to the speed of said rotatable element of said generator coupled to said switching means for maintaining said polyphase winding in a Y-connection when the speed of said rotatable element of said generator is below a predetermined value, said control means being operable to cause said switching means to connect said polyphase winding in a delta connection when the speed of said rotatable element of said generator exceeds said predetermined speed of said generator.

3. An electrical system comprising, an alternating current generator having a polyphase output winding, an electrical load connected with said polyphase winding, a variable speed prime mover coupled to said generator for driving the rotatable element of said generator, a switching means operable to connect said polyphase winding in a Y or a delta connection with said electrical load, and control means responsive to the current supplied to said electrical load coupled to said switching means for controlling said switching means, said switching means being operated by said control means to maintain said polyphase winding in a Y-connection when the current supplied to said load is below a predetermined value, said control means operating said switching means to connect said polyphase winding in a delta connection when the current supplied to said load exceeds said predetermined value.

4. An electrical system comprising, an alternating current generator having a three phase output winding, a variable speed prime mover mechanically coupled to said generator for driving said generator, a rectifier network having A.C. input terminals connected with said three phase winding and having direct current output terminals for supplying a direct current load, a switch means operable to connect said three phase winding in a Y-connection or in a delta connection, and control means responsive to the speed of rotation of said prime mover for controlling said switching means, said control means being operable to cause said switching means to connect said three phase winding in a Y-connection when the speed of said prime mover is below a predetermined value, said control means being operable to cause said switching means to switch said three phase winding to a delta connection when the speed of said prime mover exceeds said predetermined value.

5. An electrical system comprising, a polyphase alternating current generator, said polyphase generator having output terminals connected with said polyphase output winding for supplying current to an electrical load, a switching means operable to connect said polyphase winding in a Y-connection or in a delta connection, a frequency responsive control means connected with one phase winding of said polyphase winding and responding to the output frequency of said generator, and means coupling said frequency responsive control means and said switching means, said frequency responsive control means being operative to maintain said polyphase winding in a Y-connection when the output frequency of said generator is below a predetermined value, said frequency responsive control means being operable to cause said switching means to connect said polyphase winding in a delta connection when the output frequency of said generator exceeds said predetermined value.

References Cited
UNITED STATES PATENTS

| 1,902,444 | 3/1933 | Hobart et al. | 318—226 |
| 1,927,208 | 9/1933 | Gay | 318—226 |
| 2,998,551 | 8/1961 | Moakler | 322—22 |
| 3,098,964 | 7/1963 | Hetzler | 322—28 |
| 3,215,923 | 11/1965 | Oster | 322—28 |
| 1,899,797 | 2/1933 | Early | 318—183 |
| 2,320,875 | 6/1943 | Liwschitz | 318—183 |
| 2,709,775 | 5/1955 | Del Carlo | 318—226 |
| 3,026,460 | 3/1962 | Fath | 318—226 |
| 2,965,765 | 12/1960 | Bolles et al. | 320—59 |

FOREIGN PATENTS

| 372,752 | 5/1932 | Great Britain. |
| 720,536 | 7/1931 | France. |

MILTON O. HIRSHFIELD, *Primary Examiner.*

R. V. LUPO, *Assistant Examiner.*